(12) United States Patent
Shin et al.

(10) Patent No.: US 8,210,744 B2
(45) Date of Patent: Jul. 3, 2012

(54) APPARATUS FOR DETECTING TEMPERATURE USING TRANSISTORS

(75) Inventors: Yoon-Jae Shin, Gyeonggi-do (KR); Sang-Jin Byun, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 89 days.

(21) Appl. No.: 12/645,727

(22) Filed: Dec. 23, 2009

(65) Prior Publication Data

US 2010/0098133 A1    Apr. 22, 2010

Related U.S. Application Data

(62) Division of application No. 11/584,651, filed on Oct. 23, 2006, now Pat. No. 7,661,879.

(30) Foreign Application Priority Data

Nov. 9, 2005    (KR) .................. 10-2005-0107049

(51) Int. Cl.
*G01K 7/00* (2006.01)
*H03K 3/00* (2006.01)

(52) U.S. Cl. ............ 374/183; 374/100; 374/1; 327/513; 702/130; 702/99

(58) Field of Classification Search .............. 374/170, 374/178, 137, 166, 167, 163, 100, 183, 115, 374/110, 111, 112, 1; 702/130–136, 99; 327/512, 513
See application file for complete search history.

(56) References Cited

U.S. PATENT DOCUMENTS

| | | | |
|---|---|---|---|
| 4,096,805 A | 6/1978 | Miner et al. | |
| 4,114,442 A | 9/1978 | Pratt | |
| 4,418,339 A * | 11/1983 | Spofford et al. | 340/595 |
| 4,480,312 A * | 10/1984 | Wingate | 702/130 |
| 4,575,806 A | 3/1986 | Aldrich et al. | |
| 4,713,783 A | 12/1987 | Fletcher | |
| 4,916,643 A | 4/1990 | Ziegler et al. | |
| 4,975,766 A | 12/1990 | Umezawa | |
| 5,334,890 A | 8/1994 | Hardee | |
| 5,572,475 A | 11/1996 | Yim et al. | |
| 5,663,899 A * | 9/1997 | Zvonar et al. | 702/130 |
| 5,902,044 A | 5/1999 | Pricer et al. | |
| 6,095,682 A * | 8/2000 | Hollander et al. | 374/121 |
| 6,612,737 B1 | 9/2003 | Lobban | |
| 6,616,332 B1 | 9/2003 | Renken et al. | |
| 7,029,171 B2 * | 4/2006 | Tesi et al. | 374/1 |
| 7,144,152 B2 * | 12/2006 | Rusu et al. | 374/141 |
| 7,180,380 B2 | 2/2007 | Bienek et al. | |
| 7,260,007 B2 * | 8/2007 | Jain et al. | 365/212 |
| 7,322,743 B2 * | 1/2008 | Gozloo et al. | 374/170 |
| 7,423,473 B2 * | 9/2008 | Kim | 327/512 |
| 7,441,949 B2 * | 10/2008 | Janzen et al. | 374/171 |

(Continued)

FOREIGN PATENT DOCUMENTS

JP    60165527    8/1985

(Continued)

*Primary Examiner* — Gail Verbitsky
(74) *Attorney, Agent, or Firm* — Venable LLP; Jeffri A. Kaminski

(57) ABSTRACT

An apparatus for detecting a temperature using transistors includes a plurality of temperature detecting units that become selectively active according to predetermined temperature intervals; and a detection signal output unit that generates detection signals according to the signals transmitted by the plurality of temperature detecting units, and outputs the detection signals.

4 Claims, 6 Drawing Sheets

U.S. PATENT DOCUMENTS

| | | | |
|---|---|---|---|
| 7,654,736 B1 * | 2/2010 | Walker | 374/176 |
| 7,677,796 B2 * | 3/2010 | Janzen et al. | 374/171 |
| 2003/0028345 A1 | 2/2003 | Watkins et al. | |
| 2003/0158683 A1 | 8/2003 | Gauthier et al. | |
| 2004/0159904 A1 | 8/2004 | Clabes et al. | |
| 2004/0208226 A1 | 10/2004 | Khaykin et al. | |
| 2004/0264277 A1 | 12/2004 | Song | |
| 2005/0099163 A1 | 5/2005 | Liepold | |
| 2007/0081575 A1 | 4/2007 | Liu et al. | |
| 2008/0259997 A1 | 10/2008 | Gardner et al. | |

FOREIGN PATENT DOCUMENTS

| | | |
|---|---|---|
| JP | 2003-218239 | 7/2003 |
| KR | 1020030073339 | 9/2003 |

* cited by examiner

APPARATUS FOR DETECTING TEMPERATURE USING TRANSISTORS

CROSS-REFERENCE TO RELATED PATENT APPLICATION

This application is a divisional of U.S. patent application Ser. No. 11/584,651, filed Oct. 23, 2006, the subject matter of which application is incorporated herein by reference in its entirety.

This application claims the benefit of Korean Patent Application No. 10-2005-0107049, filed on Nov. 9, 2005, in the Korean Intellectual Property Office, the disclosure of which is incorporated herein in its entirety by reference.

BACKGROUND

1. Technical Field

The present invention relates to an apparatus for detecting the temperature of a semiconductor integrated circuit, and, more particularly, to an apparatus for detecting the temperature using transistors that generate different signals according to temperature intervals.

2. Related Art

Semiconductor integrated circuits are used in various circumstances. That is, semiconductor integrated circuits should be used in extreme situations, such as in high or low temperatures, and in high or low pressures. In addition, the distortion, reduction, and change of the functions of the semiconductor integrated circuit due to characteristic changes of various elements in severe situations should be avoided. Nevertheless, transistors in the semiconductor integrated circuit undergo characteristic changes such as an increase in the threshold voltage at low temperatures, and a decrease in the threshold voltage at high temperatures. In addition to the transistors, various elements in the semiconductor integrated circuit have disadvantages in that original properties vary according to variations in the temperature. Thus, in order to improve the durability in designing a semiconductor integrated circuit, various tests are performed in various situations. In addition, devices have been developed in which original functions can be maintained in the various conditions.

However, according to the related art, there is no means that can cope with characteristic changes of the respective elements due to changes of an ambient temperature. When the semiconductor integrated circuit is in an extremely high temperature or an extremely low temperature, changes in the characteristics of the various elements are inevitable, and it is not possible to maintain normal functioning of a semiconductor integrated circuit.

SUMMARY

The present invention has been finalized in order to solve the above-described problems. An aspect of the invention provides an apparatus for detecting temperature using transistors, which is capable of actively coping with characteristic changes in various elements due to the temperature conditions of the semiconductor integrated circuit, by detecting the temperature of the semiconductor integrated circuit and generating different signals according to respective temperature intervals.

According to a first aspect of the present invention, an apparatus for detecting temperature using transistors includes: a plurality of temperature detecting units that become selectively active according to predetermined temperature intervals; and a detection signal output unit that generates detection signals according to the signals transmitted by the plurality of temperature detecting units, and outputs the detection signals.

According to a second aspect of the present invention, an apparatus for detecting temperature using transistors includes: a plurality of temperature detecting units that become selectively active according to predetermined temperature intervals; and a pulse generating unit that sets prescribed pulse widths to the temperature intervals detected by the plurality of temperature detecting units, generates pulses of the prescribed widths according to signals transmitted by an active temperature detecting unit among the plurality of temperature detecting units and outputs the pulses.

According to a third aspect, an apparatus for detecting temperature using transistors includes: a plurality of temperature detecting units that become selectively active according to predetermined temperature intervals; and a signal amplifying unit that sets voltage levels corresponding to the respective temperature intervals detected by the plurality of temperature detecting units, generates a signal of the voltage level corresponding to a signal transmitted by an active temperature detecting unit among the plurality of temperature detecting units, and outputs the signal.

DESCRIPTION OF EXEMPLARY EMBODIMENTS

Hereinafter, the preferred embodiments of the invention will be described in detail with reference to the accompanying drawings.

Figure 1:
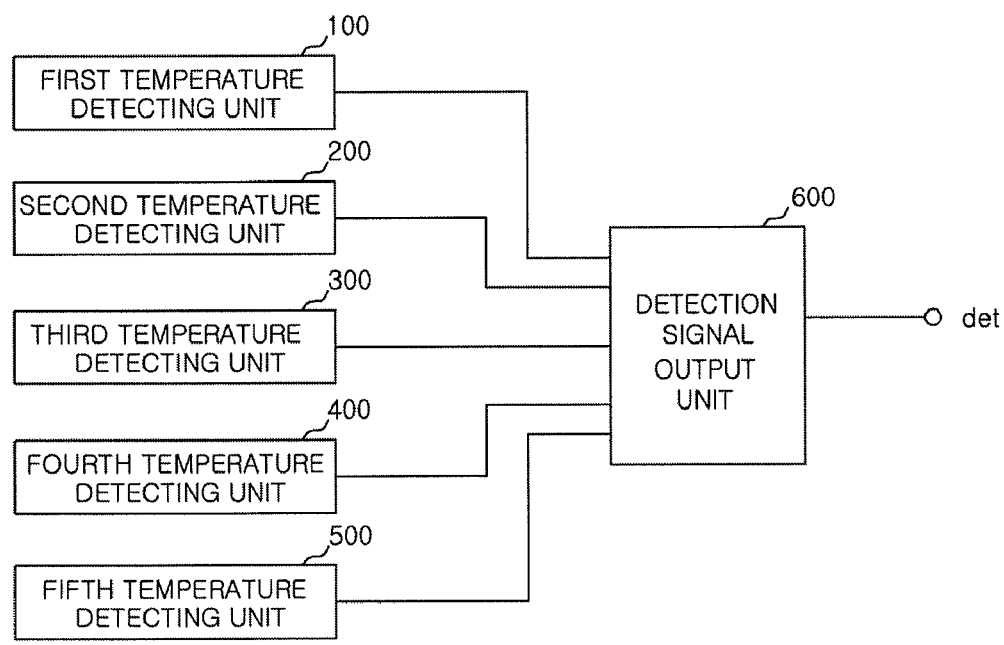
FIG. 1 is a diagram schematically illustrating a structure of a temperature detecting apparatus using transistors according to a first embodiment of the invention.

FIG. 1 is a diagram schematically illustrating a structure of a temperature detecting apparatus using transistors according to a first embodiment of the invention. A temperature detecting apparatus is exemplified which detects the temperature within five temperature intervals made by equally dividing a temperature range of −25° C. to 100° C.

As shown in FIG. 1, the temperature detecting apparatus according to the first embodiment of the invention includes five temperature detecting units 100, 200, 300, 400, and 500 that selectively become active in accordance with the assigned temperature intervals, and a detection signal output unit 600 that generates a detection signal (det) according to each of the signals transmitted by the five temperature detecting units 100, 200, 300, 400, and 500, and outputs it.

The first temperature detecting unit 100 scans the temperature interval of −25 to 0° C., and if the first temperature detecting unit detects that the temperature is within the temperature interval of −25 to 0° C., it outputs an enable signal. The second temperature detecting unit 200 scans the temperature interval of 0 to 25° C., and if the second temperature detecting unit detects that the temperature is within the temperature interval of 0 to 25° C., it outputs an enable signal. Further, the third temperature detecting unit 300 scans the temperature interval of 25 to 50° C., and if the third temperature detecting unit detects that the temperature is within the temperature interval of 25 to 50° C., it outputs an enable signal. The fourth temperature detecting unit 400 scans the temperature interval of 50 to 75° C., and if the fourth temperature detecting unit detects that the temperature is within the temperature interval of 50 to 75° C., it outputs an enable signal. Furthermore, the fifth temperature detecting unit 500 scans the temperature interval of 75 to 100° C., and if the fifth temperature detecting unit 500 detects that the temperature is within the temperature interval of 75 to 100° C., it outputs an enable signal. In this way, the temperature detecting unit of the temperature detecting apparatus that has detected the temperature, outputs an enable signal.

If an enable signal is generated by any one of the first to fifth temperature detecting units 100 to 500, the detection signal output unit 600 generates a prescribed detection signal (det) according to the temperature interval detected by the temperature detecting unit which transmitted the enable signal. In this case, the detection signal (det) may be a pulse signal or a level signal. The specific structure and operation for generating the detection signal (det) will be described in detail in the following. The detection signal (det) may be identified according to the temperature interval.

Figure 2:
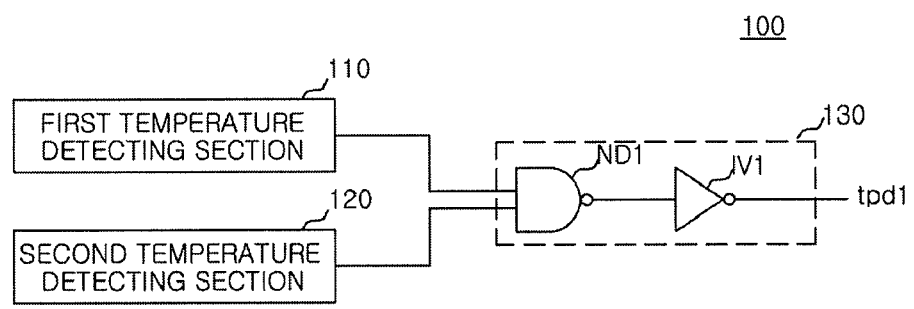
FIG. 2 is a diagram schematically illustrating a structure of a first temperature detecting unit shown in FIG. 1.

FIG. 2 is a diagram schematically illustrating a structure of the first temperature detecting unit shown in FIG. 1. In the first to fifth temperature detecting units 100 to 500, a difference in characteristics between essential elements exists. However, all of the first to fifth temperature detecting units 100 to 500 has the same structure and they operate on the same principle. Therefore, the structure and operation of the first temperature detecting unit 100 will be described, and the structure and operation of each of the second to fifth temperature detecting units 200 to 500 will not be described.

As shown in FIG. 2, the first temperature detecting unit 100 includes a first temperature detecting section 110 that outputs an enable signal when detecting a temperature of −25° C. or more, a second temperature detecting section 120 that outputs an enable signal when detecting a temperature of 0° C. or less, and a signal generating section 130 that extracts a common level region between signals outputted by the first and second temperature detecting sections 110 and 120 and generates an output signal (tpd1).

In this case, the signal generating section 130 has a first NAND gate (ND1) that receives signals outputted from the first and second temperature detecting sections 110 and 120 and extracts a common high-level region, and a first inverter (IV1).

If the first temperature detecting unit 100 detects a temperature of −10° C., the first and second temperature detecting sections 110 and 120 output high-level signals. The first NAND gate (ND1) and the first inverter (IV1) of the signal generating section 130 receive the high-level signals outputted by the first and second temperature detecting sections 110 and 120 and generate a high-level signal as output. However, in this case, low-level signals are outputted by the second to fifth temperature detecting units 200 to 500, each of which has two temperature detecting sections.

For example, if the temperature detecting apparatus is at a temperature of 30° C., since each of the first and second temperature detecting sections 110 and 120 of the first temperature detecting unit 100 output a signal of a different level, a low-level signal is outputted by the first temperature detecting unit 100. Further, since each of the two temperature detecting sections of the second temperature detecting unit 200 outputs a signal of a different level, a low-level signal is outputted by the second temperature detecting unit 200. However, each of the two temperature detecting sections of the third temperature detecting unit 300 is constructed such that it outputs a high-level signal at a temperature of 25° C. or more and at a temperature of 50° C. or less. The two temperature detecting sections of the third temperature detecting unit 300 output high-level signals. Accordingly, a high-level signal is outputted by the third temperature detecting unit 300. However, since the two temperature detecting sections of each of the fourth temperature detecting unit 400 and the fifth temperature detecting unit 500 output signals of different levels, low-level signals are outputted by the fourth and fifth temperature detecting units 400 and 500.

As such, if the temperature detecting apparatus is at a temperature of 30° C., the high-level signal is outputted by only the third temperature detecting unit 300, and then transmitted to the detection signal output unit 600. The detection signal output unit 600 generates a detection signal (det) that is set so as to identify the temperature interval of 25 to 50° C. and outputs it.

Figure 3A:
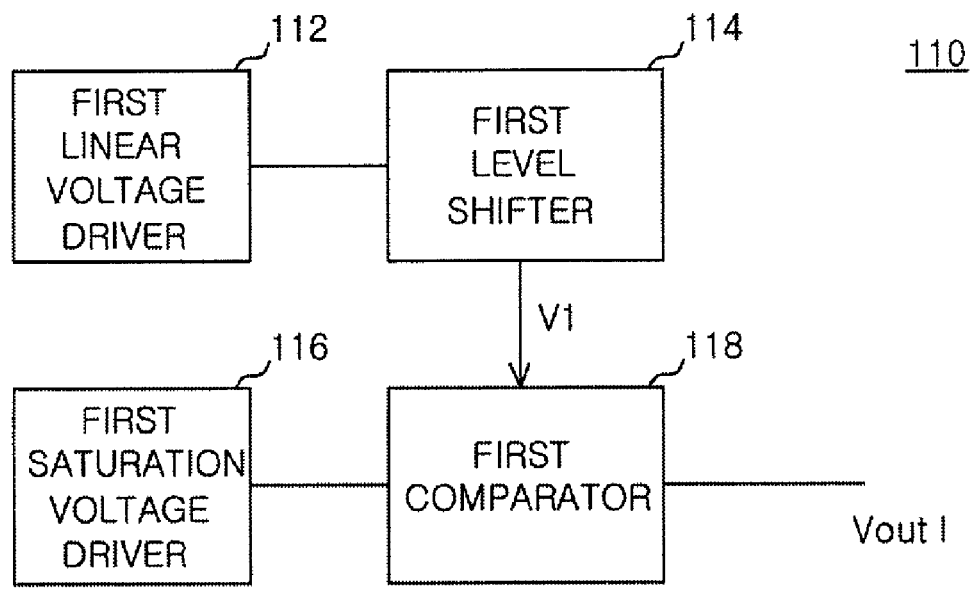
FIG. 3A is a diagram schematically illustrating a structure of a first temperature detecting section shown in FIG. 2.
Figure 3B:
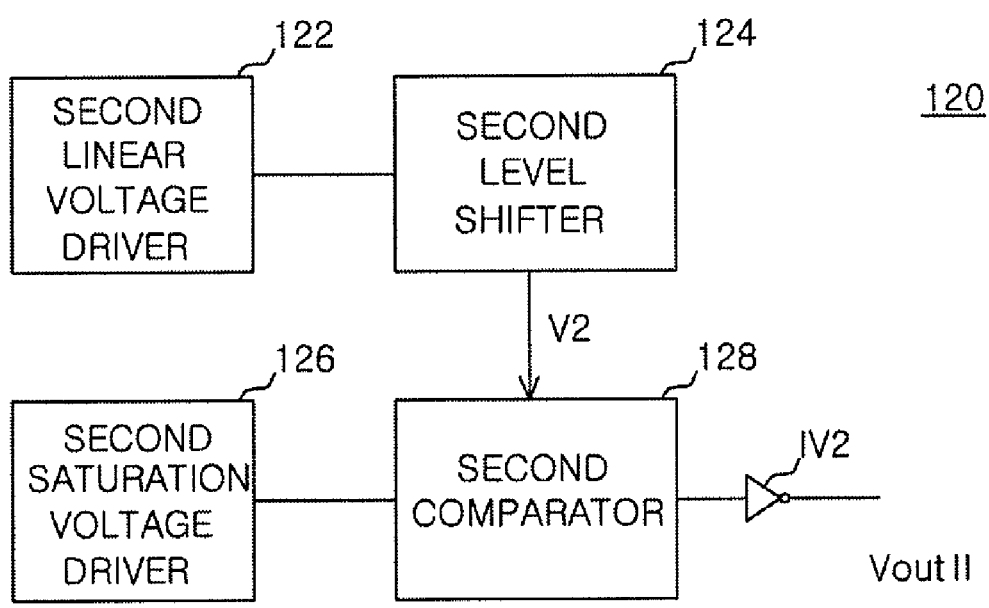
FIG. 3B is a diagram schematically illustrating a structure of a second temperature detecting section shown in FIG. 2.

FIG. 3A is a diagram schematically illustrating a structure of the first temperature detecting section shown in FIG. 2, and FIG. 3B is a diagram schematically illustrating a structure of the second temperature detecting section shown in FIG. 2.

The first temperature detecting section 110 includes a first linear voltage driver 112 that outputs a high-level signal at a temperature of −25° C. or more, a first level shifter 114 that amplifies an output signal of the first linear voltage driver 112, a first saturation voltage driver 116 that outputs a signal of a predetermined level regardless of the variation in temperature, and a first comparator 118 that compares the level of the output signal V1 of the first level shifter 114 with the level of the output signal of the first saturation voltage driver 116, outputs an enable signal when the level of the output signal V1 of the first level shifter 114 is higher than the level of the output signal of the saturation voltage driver 116, and outputs a disable signal when the level of the output signal V1 of the first level shifter 114 is lower than the level of the output signal of the saturation voltage driver 116. The output signal (VoutI) of the first comparator 118 represents either the enable or disable signal.

The second temperature detecting section 120 has the same structure and principle of operation as the first temperature detecting section 110, except that the second linear voltage driver 122 shown in FIG. 3B outputs a high-level signal at a temperature of 0° C. or more and a final output signal VoutII is a signal inverted by a second inverter IV2. The description of how the second temperature detecting section 120 operates is the same as that of description of the first temperature detecting section 110, and the operation of the first temperature detecting section 110 will be described in more detail with reference to FIG. 4. Therefore, second saturation voltage driver 126, second level shifter 124, and second comparator 128 operates the same as that of the first temperature detecting section 110.

Figure 4:
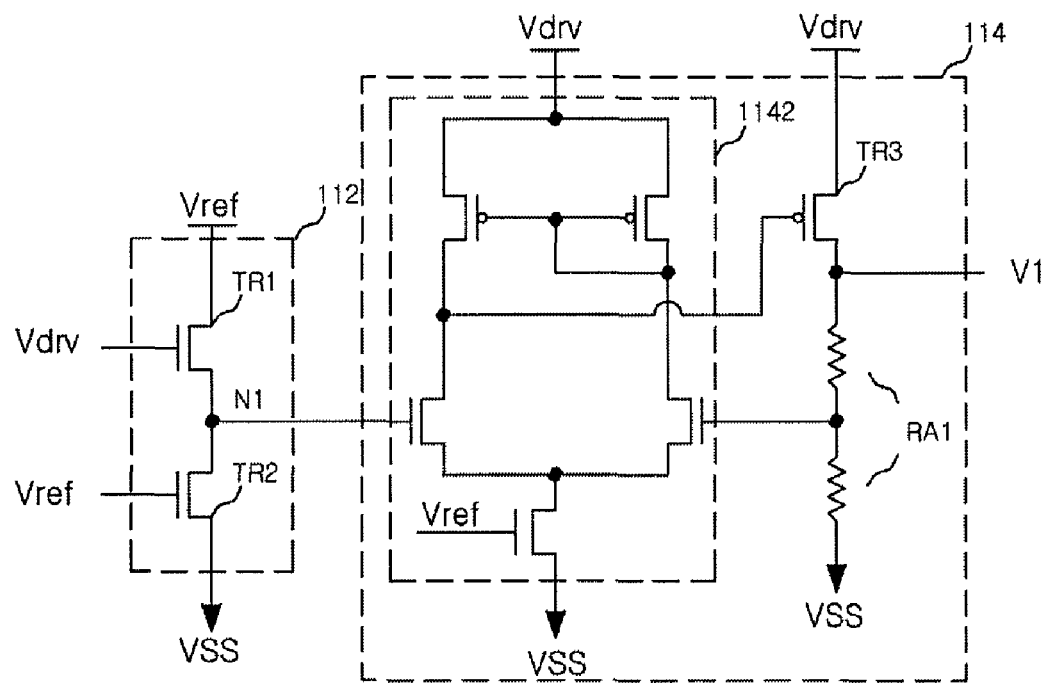
FIG. 4 is a diagram illustrating a detailed structure of a first temperature detecting section shown in FIG. 3A.
Figure 4:
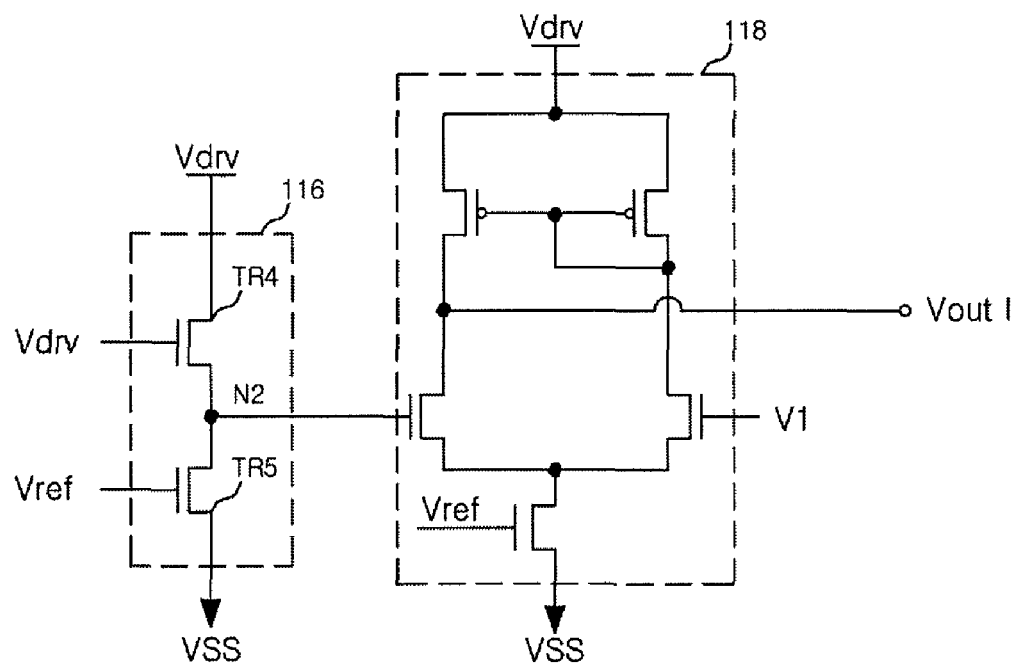

FIG. 4 is a diagram illustrating a detailed structure of the first temperature detecting section shown in FIG. 3A.

The linear voltage driver 112 includes a first transistor (TR1) which has a gate terminal applied with a driving voltage (Vdrv), a drain terminal applied with a reference voltage (Vref), and a source terminal connected to a first node (N1), and a second transistor (TR2) that has a gate terminal applied with the reference voltage (Vref), a source terminal connected to a ground VSS, and a drain terminal connected to the first node (N1). The output signal is generated at the first node (N1), and then transmitted to the level shifter 114.

Further, the first level shifter 114 includes a first differential amplifier 1142 that is inputted with the output signal of the linear voltage driver 112 and applied with the driving voltage (Vdrv), a third transistor (TR3) that is inputted with the output signal of the first differential amplifier 1142 and applied with the driving voltage (Vdrv), and a first resistor array (RA1) that allows the output signal of the linear voltage driver 112 to be amplified by a prescribed ratio.

In addition, the first saturation voltage driver 116 includes a fourth transistor (TR4) that has gate and drain terminals applied with the driving voltage (Vdrv) and a source terminal connected to a second node (N2), and a fifth transistor (TR5) that has a gate terminal applied with the reference voltage (Vref), a source terminal connected to a ground, and a drain terminal connected to the second node (N2). The output signal is generated at the second node (N2), and then transmitted to the first comparator 118.

Further, the first comparator 118 is composed of a differential amplifier that is inputted with the output signal (V1) of the first level shifter 114 and the output signal of the first saturation voltage driver 116 through node (N2) and applied with a driving voltage (Vdrv).

At this time, the driving voltage (Vdrv) corresponds to a voltage that is greater than a sum of the voltage at the drain terminal and a threshold voltage of the first transistor (TR1) of the first linear voltage driver 112. This allows the first transistor (TR1) of the first linear voltage driver 112 to be operated in a linear region. The driving voltage (Vdrv) is greater than the reference voltage (Vref) by a predetermined value or more and thus may be implemented as a core voltage (Vcore, not shown) in accordance with the level of the reference voltage (Vref).

According to the characteristic of the first transistor (TR1) of the first linear voltage driver 112, the amplified by a prescribed ratio.

In addition, the first saturation voltage driver 116 includes a fourth transistor (TR4) that has gate and drain terminals applied with the driving voltage (Vdrv) and a source terminal connected to a second node (N2), and a fifth transistor (TR5) that has a gate terminal applied with the reference voltage (Vref), a source terminal connected to a ground, and a drain terminal connected to the second node (N2). The output signal is generated at the second node (N2), and then transmitted to the first comparator 118.

Further, the first comparator 118 is composed of a differential amplifier that is inputted with the output signal (V1) of the first level shifter 114 and the output signal of the first saturation voltage driver 116 through node (N2) and applied with a driving voltage (Vdrv).

At this time, the driving voltage (Vdrv) corresponds to a voltage that is greater than a sum of the voltage at the drain terminal and a threshold voltage of the first transistor (TR1) of the first linear voltage driver 112. This allows the first transistor (TR1) of the first linear voltage driver 112 to be operated in a linear region. The driving voltage (Vdrv) is greater than the reference voltage (Vref) by a predetermined value or more and thus may be implemented as a core voltage (Vcore, not shown) in accordance with the level of the reference voltage (Vref).

According to the characteristic of the first transistor (TR1) of the first linear voltage driver 112, the threshold voltage of the first transistor (TR1) at a temperature of −25° C. or more is smaller than the threshold voltage of the first transistor (TR1) at a temperature of −25° C. or less. Generally, when the length of an MOS transistor becomes shorter, the threshold voltage thereof is decreased, and the variation of the current for the input voltage is increased. Therefore, if the threshold voltage is decreased at the predetermined temperature or more, the amount of current flowing between the drain terminal and the source terminal varies significantly. Thus, the length of the MOS transistor is adjusted such that the threshold voltage is reduced at the predetermined temperature or more. At the time of manufacturing the first transistor TR1, the length of the first transistor TR1 is adjusted such that its threshold voltage is significantly reduced at a temperature of −25° C. or more.

Similar to the first temperature detecting section 110, in the linear voltage driver of the second temperature detecting section 120, a transistor is used having a length adjusted such that its threshold voltage is significantly reduced at a temperature of 0° C. or more. In the temperature detecting sections of each of the second to fifth temperature detecting units 200 to 500, it can be assumed that a transistor having the characteristic that its threshold voltage is significantly reduced at the lower temperature limit or above of each temperature interval and a transistor having the characteristic that its threshold voltage is significantly reduced at the upper limit temperature or more of each temperature interval are used.

The reference voltage (Vref) is applied to a drain terminal of the first transistor (TR1) of the first linear voltage driver 112, and the driving voltage (Vdrv) is applied to the gate terminal of the first transistor (TR1). Therefore, a voltage value obtained by subtracting the threshold voltage value from the voltage value between the gate terminal and the source terminal of the first transistor (TR1), becomes greater than the voltage value between the drain terminal and the source terminal. Thus, the first transistor (TR1) operates in a linear region, which results in increasing the variation of the current for the variation in temperature. However, the drain terminal of the second transistor (TR2) is connected to the source terminal of the first transistor (TR1), and the gate terminal of the second transistor (TR2) is applied with the reference voltage (Vref). At this time, the voltage value that is obtained by subtracting the threshold voltage value from the voltage value between the gate terminal and the source terminal of the second transistor (TR2) is not greater than the voltage value between the drain terminal and the source terminal. Therefore, the second transistor (TR2) operates in a saturation region, and as a result, the variation of the current for the variation in temperature is not increased.

When the first linear voltage driver 112 is at a temperature of −25° C. or more, a large amount of current flows through the first transistor (TR1) while a predetermined amount of current flows through the second transistor (TR2) independent of the temperature. As a result, the high-level output signal is transmitted to the first level shifter 114. In contrast, when the first linear voltage driver 112 is at a temperature of −25° C. or less, a small amount of current flows through the first transistor (TR1), and the low-level output signal is transmitted to the first level shifter 114.

The first level shifter 114 serves to amplify the signal received from the first linear voltage driver 112. When the potential level of the output signal of the first linear voltage driver 112 is low, the third transistor (TR3) is turned off. As a result, the third transistor (TR3) prevents the driving voltage (Vdrv) from being supplied to the first resistor array (RA1) so as to lower the potential level of the output signal (V1). When the potential level of the output signal of the first linear voltage driver 112 is high, the third transistor (TR3) is turned on. As a result, the third transistor (TR3) allows the driving voltage (Vdrv) to be supplied to the first resistor array (RA1) so as to raise the potential level of the output signal (V1). The first resistor array (RA1) distributes the potential of the output signal (V1) according to the resistance ratio of the first resistor array (RA1) and inputs the distributed output signal to the first differential amplifier 1142. Since the level of the output signal of the first linear voltage driver 112 is equal to the level of the signal inputted by the first resistor array (RA1), the output signal (V1) rises according to the voltage distribution ratio of the first resistor array (RA1). That is, when the first resistor array (RA1) is composed of two resistors of a ratio of 1:1, the output signal (V1) has a voltage that is twice as much as the voltage of the input signal transmitted by the linear voltage driver 112.

The driving voltage (Vdrv) is applied to the gate terminal and the drain terminal of the fourth transistor (TR4) of the first saturation voltage driver 116. Therefore, the voltage value, which is obtained by subtracting the threshold voltage value from the voltage value between the gate terminal and the source terminal of the fourth transistor (TR4), is not more than the voltage value between the drain terminal and the source terminal. Therefore, the fourth transistor (TR4) operates in the saturation region, and the variation of the current for the variation in temperature is not large. The drain terminal of the fifth transistor (TR5) is connected to the source terminal of the fourth transistor (TR4), and the gate terminal of the fifth transistor (TR5) is applied with the reference voltage (Vref). The voltage value, which is obtained by subtracting the threshold voltage value from the voltage value between the gate terminal and the source terminal of the fifth transistor (TR5), is not more than the voltage value between the drain terminal and the source terminal. Therefore, the fifth transistor (TR5) also operates in the saturation region.

Thus, the fifth transistor (TR5) outputs a signal of a predetermined size, independent of the variation in temperature, and the output signal is then transmitted to the first comparator 118.

The first comparator 118 receives the output signal (V1) of the first level shifter 114 and the output signal of the first saturation voltage driver 116 and compares them with each other. If the potential of the output signal (V1) of the first level shifter 114 is smaller than that of the output signal of the first saturation voltage driver 116, that is, if the ambient temperature does not exceed a temperature of −25° C., the output signal (VoutI) of the first comparator 118 becomes a low level signal. However, if the potential of the output signal (V1) of the first level shifter 114 is greater than that of the output signal of the first saturation voltage driver 116, that is, if the ambient temperature exceeds a temperature of −25° C., the output signal (VoutI) of the first comparator 118 becomes a high level signal.

By manufacturing a transistor whose threshold value is rapidly reduced at a temperature of 0° C. or more, by adjusting the length of the transistor, for the second linear voltage driver 122 of the second temperature detecting section 120, the output signal (VoutII) of the second temperature detecting section 120 can be generated in the same principle. As opposed to the output signal (VoutI) of the first temperature detecting section 110, the output signal (VoutII) of the second temperature detecting section 120 is inverted by the second inverter IV2, and then outputted. As a result, the output signal (VoutII) of the second temperature detecting section 120 becomes a high level signal at a temperature of 0° C. or less, and becomes a low level signal at a temperature of 0° C. or more. In addition, under the same principle, the temperature detecting sections of each of the second to fifth temperature detecting units 200 to 500 output the voltage according to the respective temperature intervals.

The output signal (VoutI) of the first temperature detecting section 110 and the output signal (VoutII) of the second temperature detecting section 120 are inputted to the signal generating section 130, and the signal generating section 130 extracts a common high-level region between the two signals and transmits it to the detection signal output unit 600.

Figure 5:
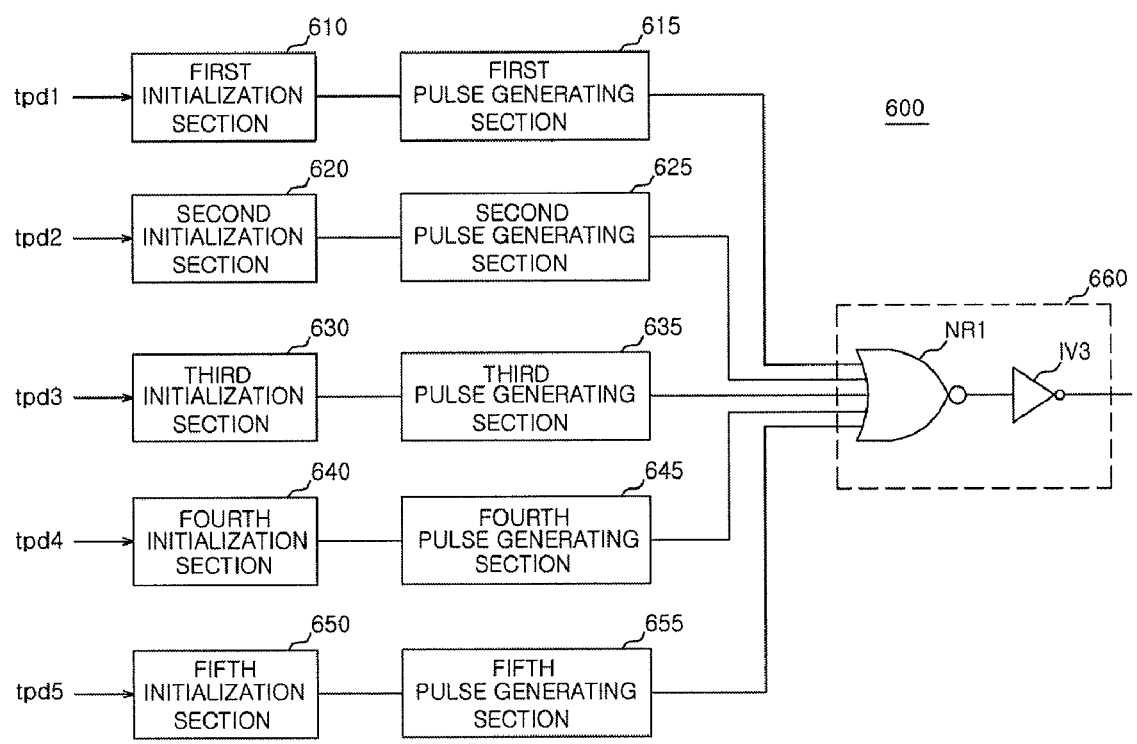
FIG. 5 is a first exemplary view illustrating a structure of a detection signal output unit shown in FIG. 1.

FIG. 5 is a first exemplary view illustrating a structure of the detection signal output unit shown in FIG. 1. The detection signal (det) is a pulse signal that has a different width according to the temperature interval. Therefore, the detection signal output unit is referred to as a pulse generating unit.

The pulse generating unit 600 includes first to fifth initialization sections 610, 620, 630, 640, and 650 that correspond to the first to fifth temperature detecting units 100 to 500, respectively, and sink the level of an initial voltage of the pulse generating unit 600 to the level of a ground voltage (VSS, not shown in FIG. 5) for a predetermined time, first to fifth pulse generating sections 615, 625, 635, 645, and 655 that generate, when enable signals are inputted by the first to fifth initialization sections 610 to 650 after a predetermined time, a pulse of prescribed amplitude and output it, and a pulse output section 660 that outputs only the output pulse of the pulse generating section, among the first to fifth pulse generating sections 615 to 655, which has generated the pulse. The first to fifth initialization sections 610, 620, 630, 640, and 650 receive generated output signals (tpd1), (tpd2), (tpd3), (tpd4), and (tpd5), respectively.

As shown in FIG. 5, the pulse output section 660 has a first NOR gate (NR1) and a third inverter (IV3) that receive the respective output signals from the first to fifth pulse generating sections 615 to 655 and extract a pulse signal.

Each of the first to fifth initialization sections 610 to 650 has the same structure and principle of operation. Hereinafter, the structure and principle of operation of the first initialization section 610 will be described, which is representative of the structure and principle of operation of each of the other initialization sections 620 to 650. Each of the first to fifth pulse generating sections 615 to 655 has the same structure and principle of operation. Hereinafter, the structure and principle of operation of the first pulse generating section 615 will be described, which is representative of the structure and principle of operation of each of the other pulse generating sections 625 to 655.

Figure 6A:
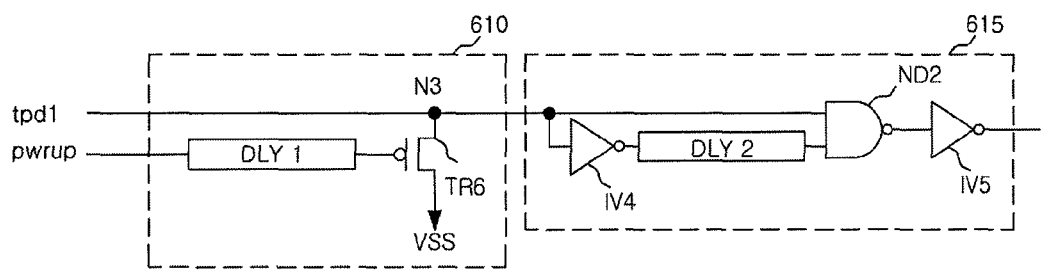
FIG. 6A is a first exemplary view illustrating structures of a first initialization section and a first pulse generating section shown in FIG. 5.

FIG. 6A is a first exemplary view illustrating the structures of the first initialization section and the first pulse generating section shown in FIG. 5.

The first initialization section 610 includes a first delayer (DLY1) that delays for a predetermined time a power up signal (pwrup) instructing that power is supplied to the semiconductor integrated circuit, and a sixth transistor (TR6) that has a gate terminal inputted with the output signal of the first delayer (DLY1), a drain terminal connected to a ground VSS, and a source terminal connected to the third node (N3). The output signal (tpd1) of the first temperature detecting unit 100 is transmitted to the third node (N3), and the third node (N3) is connected to the first pulse generating section 615.

In addition, the first pulse generating section 615 includes a fourth inverter (IV4) that inverts the output signal of the first initialization section 610, a second delayer (DLY2) that delays for a prescribed time the output signal of the fourth inverter (IV4) according to the temperature interval, a second NAND gate (ND2) and a fifth inverter (IV5) that extract of a common high-level region between the output signal of the first initialization section 610 and the output signal of the second delayer (DLY2).

If the enabled power up signal (pwrup) is inputted to the first delayer (DLY1) of the first initialization section 610 at the time of the initial operation of the semiconductor integrated circuit, the first delayer (DLY1) delays the power up signal (pwrup) for a predetermined time. Since the low-level voltage is applied to the gate terminal of the sixth transistor (TR6) for the predetermined time, the sixth transistor (TR6) is turned on, and makes the third node (N3) connected to a ground. At this time, even when the output signal (tpd1) of the first temperature detecting unit 100 is a high level signal, the low-level signal is transmitted to the first pulse generating section 615. After the delayed time set by the first delayer (DLY1), if the high-level power up signal (pwrup) is input to the gate terminal of the sixth transistor (TR6), the sixth transistor (TR6) is turned off, and the third node (N3) is applied with the voltage of the level of the output signal (tpd1) of the first temperature detecting unit 100. Accordingly, the high-level signal is transmitted to the first pulse generating section 615.

The first pulse generating section 615 inverts the high-level signal through the fourth inverter (IV4), and thus delays the inverted signal through the second delayer (DLY2) for a predetermined time. At this time, the second delayer (DLY2) applies to the signal the delayed time for generating the pulse of the amplitude assigned to the temperature interval of the first temperature detecting unit 100. Then, the second NAND gate (ND2) and the fifth inverter (IV5) extract the common high-level region between the signal transmitted by the first initialization section 610 and the signal transmitted through the second delayer (DLY2), and transmits the extracted common high-level region to the pulse output section 660. That is, each of the pulses of the different amplitudes, which are generated according to the respective temperature intervals detected by the first to fifth temperature detecting units 100 to 500, are determined by each of the delayed times that are set by the first to fifth pulse generating sections 615 to 655 to the output signals of the first to fifth initialization sections 610 to 650 in order to generate the pulses.

The reason why the initialization operation is necessary is because if the level signal outputted by the temperature detecting unit has a predetermined level without being shifted at the time of the initial operation of the semiconductor integrated circuit, the pulses are not generated. Therefore, after the initialization operation is performed for a predetermined time, the level signal is shifted so as to generate pulses.

The pulse output section 660 extracts the pulse signals from the signals transmitted by the first to fifth pulse generating sections 615 to 655. If a pulse having a predetermined amplitude is transmitted by the first pulse generating section 615, the low-level signals are transmitted by the other pulse generating sections 625 to 655. Therefore, the pulse from the pulse output section 660 becomes the pulse transmitted by the first pulse generating section 615.

Figure 6B:
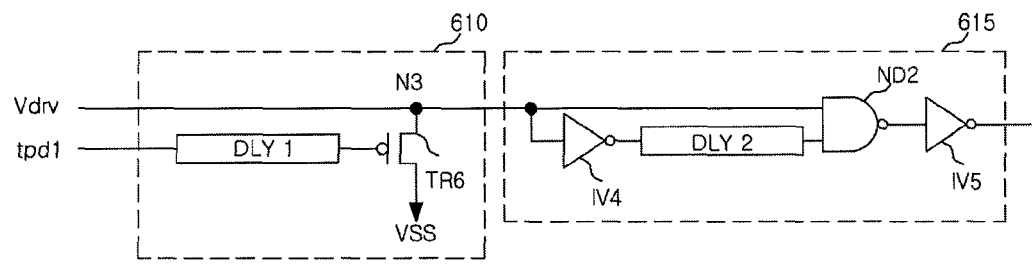
FIG. 6B is a second exemplary view illustrating structures of a first initialization section and a first pulse generating section shown in FIG. 5.

FIG. 6B is a second exemplary view illustrating structures of the first initialization section and the first pulse generating section shown in FIG. 5.

The structures of the first initialization section 610 and the first pulse generating section 615 shown in FIG. 6B are the same as those of the first initialization section 610 and the first pulse generating section 615 shown in FIG. 6A, except that in the structure shown in FIG. 6B, the output signal (tpd1) of the first temperature detecting unit 100 is used instead of the power up signal (pwrup), and the driving voltage (Vdrv) is used instead of the output signal (tpd1) of the first temperature detecting unit 100.

That is, in FIG. 6B, for a time when the output signal (tpd1) of the first temperature detecting unit 100 is delayed by the first delayer (DLY1), the third node (N3) is connected to ground (VSS). After the delayed time, the driving voltage (Vdrv) is applied to the third node (N3), and then transmitted to the first pulse generating section 615.

In this case, the driving voltage (Vdrv) can be implemented by a voltage other than the ground voltage (VSS), and may be implemented by the core voltage (not shown).

Figure 7:
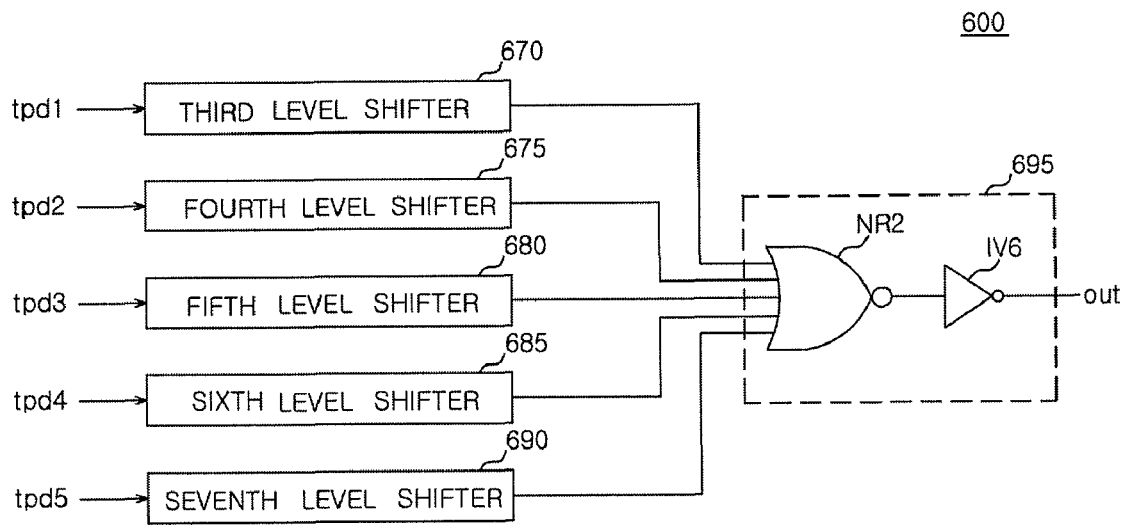
FIG. 7 is a second exemplary view illustrating a structure of a detection signal output unit shown in FIG. 1.

FIG. 7 is a second exemplary view illustrating a structure of the detection signal output unit shown in FIG. 1. In this case, the detection signal (det) is a signal having a different level according to each temperature interval. Therefore, the detection signal output unit is referred to as a signal amplifying unit.

The signal amplifying unit 600 includes third to seventh level shifters 670, 675, 680, 685, and 690 that correspond to the first to fifth temperature detecting units 100 to 500, respectively, and convert the level of the output signal of the temperature detecting unit, among the first to fifth temperature detecting units 100 to 500, which outputs the enable signal, into a prescribed level, and a level signal output section 695 that outputs only the output signal of the level shifter, among the third to seventh level shifters 670, 675, 680, 685, and 690, which outputs the signal.

The level signal output section 695 includes a second NOR gate (NR2) and a sixth inverter (IV6) that receive the signals outputted by the third to seventh level shifters 615, 625, 635, 645, and 655 and extract the high-level signal.

The third to seventh level shifters 670, 675, 680, 685, and 690 have the same structure and principle of operation. Therefore, only the structure and principle of operation of the third level shifter 670 will be described as it is representative of the other level shifters 675, 680, 685, and 690.

Figure 8:
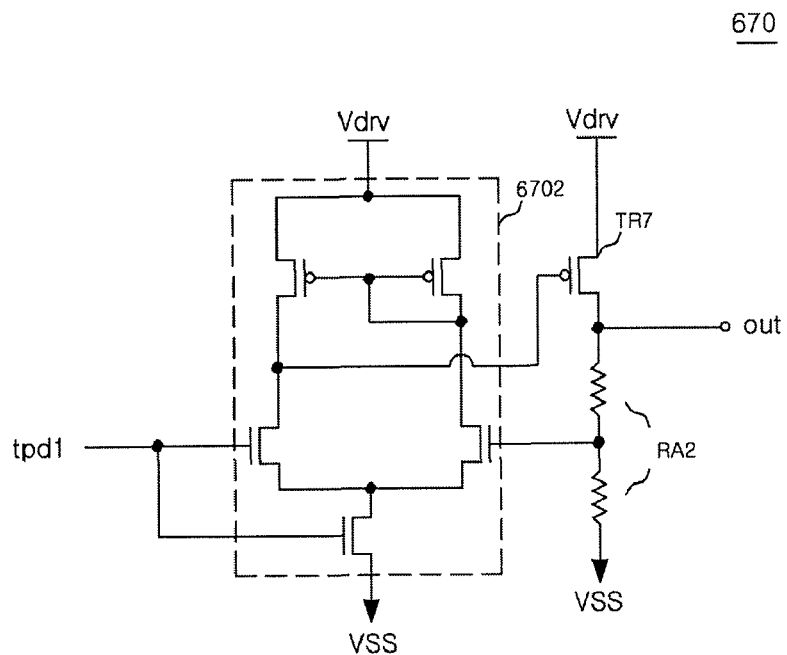
FIG. 8 is a diagram illustrating a detailed structure of a third level shifter shown in FIG. 7.

FIG. 8 is a diagram illustrating a detailed structure of the third level shifter shown in FIG. 7.

The third level shifter 670 includes a second differential amplifier 6702 that is inputted with the output signal (tpd1) of the first temperature detecting unit 100 and applied with the driving voltage (Vdrv), a seventh transistor (TR7) that is inputted with the output signal of the second differential amplifier 6702 and applied with the driving voltage (Vdrv), and a second resistor array (RA2) that allows the output signal (tpd1) of the first temperature detecting unit 100 to be amplified by a prescribed ratio according to the temperature interval detected by the first temperature detecting unit 100.

If the output signal (tpd1) of the first temperature detecting unit 100 is shifted to a high level and then inputted to the second differential amplifier 6702, the third level shifter 670 is operated. At this time, the second resistor array (RA2) distributes the potential of the output signal (out) according to the resistance ratio and inputs it to the second differential amplifier 6702. Since the level of the signal inputted by the first temperature detecting unit 100 is equal to the level of the signal inputted by the second resistor array (RA2), the output signal (out) rises according to the voltage distribution ratio of the second resistor array (RA2). As such, each of the fourth to seventh level shifters 675, 680, 685, and 690 adjusts the voltage distribution ratio of the resistor array, and outputs the signal of a different level according to the temperature detecting interval detected by each of the second to fifth temperature detecting units 200, 300, 400, and 500.

Hereinafter, the level signal output section 695 extracts a high-level signal among the signals that are transmitted by the third to seventh level shifters 670, 675, 680, 685, and 690. If the high-level signal is transmitted by the third level shifter 670, the low-level signals are transmitted by the other level shifters 675, 680, 685, and 690. Accordingly, a signal that is transmitted by the third level shifter 670 becomes the signal that is outputted by the level signal output section 695.

It will be apparent to those skilled in the art that various modifications and changes may be made without departing from the scope and spirit of the present invention. Therefore, it should be understood that the above embodiments are not limitative, but illustrative in all aspects. The scope of the present invention is defined by the appended claims rather than by the description preceding them, and all changes and modifications that fall within metes and bounds of the claims, or equivalents of such metes and bounds are therefore intended to be embraced by the claims.

According to the embodiment of the invention, it is possible to create an apparatus for detecting a temperature using transistors, which is capable of recognizing the temperature situations of a semiconductor integrated circuit and actively coping with characteristic changes in various elements due to the temperature conditions of the semiconductor integrated circuit, by detecting the temperature of the semiconductor integrated circuit and generating different signals according to the respective temperature intervals.

What is claimed is:

1. An apparatus for detecting temperature, comprising:
   a plurality of temperature detecting units configured to be activated according to predetermined temperature intervals; and
   a detection signal output unit that generates detection signals according to the signals transmitted by the plurality of temperature detecting units and outputs the detection signal,
   wherein each of the plurality of temperature detecting units includes:
   a first temperature detecting section that generates an enable signal at the lower temperature limit or above in a set temperature interval;
   a second temperature detecting section that generates an enable signal at the upper temperature limit or below in the set temperature interval; and
   a signal generating section that extracts overlapping intervals between a voltage level of the enable signal output from the first temperature detecting section and a voltage level of the enable signal output from the second temperature detecting section and generates an output signal.

2. The apparatus for detecting temperature of claim 1, wherein the first temperature detecting section includes:
   a linear voltage driver that outputs an enable signal at the lower temperature limit or above of the set temperature interval;
   a level shifter that amplifies an output signal of the linear voltage driver;
   a saturation voltage driver that outputs a signal of a predetermined level independent of the variation in temperature; and
   a comparator that compares an output signal level of the level shifter with an output signal level of the saturation voltage driver, and outputs an enable signal when the output signal level of the level shifter is higher than the output signal level of the saturation voltage driver, and outputs a disable signal when the output signal level of the level shifter is lower than the output signal level of the saturation voltage driver.

3. The apparatus for detecting temperature of claim 1, wherein the second temperature detecting section includes:
   a linear voltage driver that outputs an enable signal at the upper temperature limit or below in the temperature interval detected by the apparatus for detecting a temperature;
   a level shifter that amplifies an output signal of the linear voltage driver;
   a saturation voltage driver that outputs a signal of a predetermined level independent of the variation in temperature;
   a comparator that compares an output signal level of the level shifter with an output signal level of the saturation voltage driver, and outputs an enable signal when the output signal level of the level shifter is higher than the output signal level of the saturation voltage driver, and outputs a disable signal when the output signal level of the level shifter is lower than the output signal level of the saturation voltage driver; and
   an inverter that inverts a phase of the comparator output signal, and outputs the inverted signal.

4. The apparatus for detecting temperature of claim 1, wherein one of the plurality of temperature detecting units is activated in accordance with the temperature interval.

* * * * *